US012284534B2

(12) United States Patent
Katepalli et al.

(10) Patent No.: US 12,284,534 B2
(45) Date of Patent: Apr. 22, 2025

(54) DYNAMIC MEASUREMENT PERIODS IN WIRELESS COMMUNICATIONS

(71) Applicant: AIRSPAN IP HOLDCO LLC, Boca Raton, FL (US)

(72) Inventors: Venkateswarlu Katepalli, Slough (GB); Andrew Logothetis, High Wycombe (GB); Jianling Chen, London (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 385 days.

(21) Appl. No.: 17/824,374

(22) Filed: May 25, 2022

(65) Prior Publication Data

US 2022/0386142 A1 Dec. 1, 2022

(30) Foreign Application Priority Data

May 28, 2021 (GB) ..................................... 2107682

(51) Int. Cl.
*H04W 84/06* (2009.01)
*H04B 17/318* (2015.01)
(Continued)

(52) U.S. Cl.
CPC .......... *H04W 16/28* (2013.01); *H04B 17/318* (2015.01); *H04W 24/10* (2013.01);
(Continued)

(58) Field of Classification Search
CPC ..... H04W 16/28; H04W 24/10; H04W 84/06; H04B 17/318
See application file for complete search history.

(56) References Cited

U.S. PATENT DOCUMENTS 10,891,869 B1 * 1/2021 McIntosh ............... G08G 5/045
2018/0242190 A1 * 8/2018 Khoryaev ............... H04W 4/40
(Continued)

FOREIGN PATENT DOCUMENTS

TW 202105931 A * 2/2021 ............. G06N 3/045
WO 2021063783 4/2021

OTHER PUBLICATIONS

3GPP TSG RAN WG1 Meeting#92, R1-1802365 Title: Remaning Synchronization Details for the LTE V2V Sidelink Carrier aggregation (Year: 2018).*

(Continued)

*Primary Examiner* — Faruk Hamza
*Assistant Examiner* — Abusayeed M Haque
(74) *Attorney, Agent, or Firm* — Andrew L. Dunlap; Haynes Beffel & Wolfeld LLP (57) ABSTRACT

There is provided an apparatus and method for use with a moving vehicle. The apparatus comprises antenna circuitry for communicating with a main cell using an antenna configuration. Configuration circuitry performs an analysis process in which the antenna configuration is changed to communicate with and create a measurement of each of a plurality of candidate cells including the main cell, and to provide a result of the analysis process to the main cell. Control circuitry causes the configuration circuitry to perform the analysis process with a predetermined period. The control circuitry is configured to dynamically change the predetermined period based on at least one characteristic of a received signal of the main cell.

19 Claims, 7 Drawing Sheets

(51) Int. Cl.
    *H04W 16/28*     (2009.01)
    *H04W 24/10*     (2009.01)
    *H04W 36/16*     (2009.01)
    *H04W 36/08*     (2009.01)

(52) U.S. Cl.
    CPC ........ *H04W 36/085* (2023.05); *H04W 36/165* (2013.01); *H04W 84/06* (2013.01)

(56) References Cited

U.S. PATENT DOCUMENTS

| | | |
|---|---|---|
| 2018/0255472 A1 | 9/2018 | Chendamarai Kannan et al. |
| 2019/0394694 A1 | 12/2019 | Dent et al. |
| 2020/0343944 A1* | 10/2020 | Kim ..................... H04B 7/0691 |
| 2021/0105647 A1 | 4/2021 | Lee |
| 2021/0159971 A1* | 5/2021 | Panchal ............... H04B 7/1855 |
| 2021/0250816 A1* | 8/2021 | Xu .................. H04W 36/00837 |
| 2021/0306941 A1* | 9/2021 | Lashbrook ............... H01Q 3/08 |
| 2021/0336688 A1* | 10/2021 | Lee ......................... H04W 4/40 |
| 2021/0409128 A1* | 12/2021 | Raghavan ............ H04B 7/0617 |
| 2022/0394697 A1* | 12/2022 | Kim ..................... H04W 72/54 |

OTHER PUBLICATIONS

EP Extended Search Report from EP22175648.9 dated Oct. 24, 2022, 16 pages.
GB Search Report from GB2107682.3 (1059) dated Mar. 10, 2022, 4 pages.
3GPP Standard, 2019, "3rd Geneacration Partnership Project; Technical Specification Group Radio Access Network; NR; Study on User Equipment (UE) power saving in NR (Release 16)", pp. 1-74.

* cited by examiner

| SS-RSRP (dBm) | Neighbour Measurement Period (sec) |
|---|---|
| < -120 | 5 |
| [-120, -110) | 10 |
| [-110, -100) | 15 |
| [-100, -90) | 20 |
| > -90 | 60 |

FIG. 3A

| SS-SINR (dB) | Neighbour Measurement Period (sec) |
|---|---|
| < 5 | 5 |
| [5, 10) | 10 |
| [10, 15) | 15 |
| [15, 20) | 20 |
| > 20 | 60 |

FIG. 3B

| Neighbour Measurement Period (sec) | SS-SINR (dB) | | | | |
|---|---|---|---|---|---|
| | < 5 | [5, 10) | [10, 15) | [15, 20) | > 20 |
| SS-RSRP (dBm) < -120 | 1 | 2 | 3 | 4 | 5 |
| [-120, -110) | 6 | 7 | 8 | 9 | 10 |
| [-110, -100) | 11 | 12 | 13 | 14 | 15 |
| [-100, -90) | 15 | 20 | 25 | 30 | 35 |
| > -90 | 40 | 45 | 50 | 55 | 60 |

FIG. 3C

| Neighbour Measurement Period (sec) | SS-SINR (dB) | | | |
|---|---|---|---|---|
| | 5 | 10 | 15 | 20 |
| SS-RSRP (dBm) -120 | 2.00 | 3.67 | 5.33 | 7.00 |
| -110 | 14.67 | 16.33 | 18.00 | 19.67 |
| -100 | 27.33 | 29.00 | 30.67 | 32.33 |
| -90 | 40.00 | 41.67 | 43.33 | 45.0 |

DYNAMIC MEASUREMENT PERIODS IN WIRELESS COMMUNICATIONS

The present technique relates to wireless networks.

In a wireless network, it may be desirable to periodically make a measurements that can be achieved with uplink nodes in order to determine whether a better link can be achieved than the one that is currently in operation. However, this process is often disruptive to the current link.

Viewed from a first example configuration, there is provided an apparatus for use with a moving vehicle, the apparatus comprising: antenna circuitry configured to communicate with a main cell using an antenna configuration; configuration circuitry configured to perform an analysis process in which the antenna configuration is changed to communicate with and create a measurement of each of a plurality of candidate cells including the main cell, and to provide a result of the analysis process to the main cell; and control circuitry configured to cause the configuration circuitry to perform the analysis process with a predetermined period, wherein the control circuitry is configured to dynamically change the predetermined period based on at least one characteristic of a received signal of the main cell.

Viewed from a second example configuration, there is provided method of analysing a plurality of candidate cells from a moving vehicle, the method comprising: communicating with a main cell using an antenna configuration; performing an analysis process in which the antenna configuration is changed to communicate with and create a measurement of each of a plurality of the candidate cells including the main cell, and to provide a result of the analysis process to the main cell; and causing the analysis process to be performed with a predetermined period, wherein the predetermined period is dynamically changed based on a quality of a received signal of the main cell.

The present technique will be described further, by way of example only, with reference to embodiments thereof as illustrated in the accompanying drawings, in which:

FIG. 2, made up of FIGS. 2A, 2B, and 2C collectively illustrate the behaviour of the analysis process;

Before discussing the embodiments with reference to the accompanying figures, the following description of embodiments and associated advantages is provided.

In wireless communications systems, such as the 3GPP 5th generation communications standard known as New Radio (NR), Measurements Gaps (MG) can be used by the UE to perform a neighbour measurement while temporarily disconnecting from its current Serving Cell (SC). Measurement gaps are activated and deactivated by the SC. During the measurement gap the UE pauses the communication with the SC and instead carries out the measurements of other neighbour cells.

Measurement gaps are used for inter-frequency or inter-system measurements. During these measurement periods, the UE transceiver retunes its RF components to the new frequency to carry out link quality measurements to a set of candidates (neighbour) cells. Once the gap period is complete, the RF transceiver is retuned to the frequency of the original SC. Gaps are also used for intra-frequency measurement reports. This is particularly apparent in a systems with a single transceiver using analogue or digital beamforming, where a single beam is steered in the direction of the candidate NC to perform the neighbour measurement. The beam is steered back to the SC once the MG period is over.

Measurement gaps should be used sparingly, since they interrupt both uplink and downlink data transfers from the SC. Furthermore, the gNB has to explicitly signal the UE via RRC messages for the measurement gap configuration based either on a periodic or an event driven method. For example, within the framework of the 3GPP standard the event driven mechanism is carried out using the A2 event to start the measurement gap and the A1 event to stop the measurement gap. Every time the measurement gap configuration changes, the gNB has to signal the UE the new configuration. This high level of control signalling overhead comes to the detriment of user throughput, since the radio resources are scarce and are shared between different UEs.

In accordance with one example configuration there is provided an apparatus for use with a moving vehicle, the apparatus comprising: antenna circuitry configured to communicate with a main cell using an antenna configuration; configuration circuitry configured to perform an analysis process in which the antenna configuration is changed to communicate with and create a measurement of each of a plurality of candidate cells including the main cell, and to provide a result of the analysis process to the main cell; and control circuitry configured to cause the configuration circuitry to perform the analysis process with a predetermined period, wherein the control circuitry is configured to dynamically change the predetermined period based on at least one characteristic of a received signal of the main cell.

The antenna circuitry is used to perform communication with a main cell so that data can be transferred to and from the main cell. A particular antenna configuration is used in order to enable the antenna to communicate and by changing the configuration of the antenna, the cell to which the antenna circuitry communicates can be changed. The configuration circuitry makes it possible to perform an analysis process. During this, the antenna configuration is changed (possibly repeatedly) and in this way the antenna circuitry is able to communicate with a number of different cells. Each time the antenna circuitry is reconfigured (e.g. to communicate with a different cell) a measurement for that cell is performed. Having measured each of the cells, the results of the measurement are sent to the main cell (potentially by reconfiguring the antenna circuitry once more to enable such communication to take place). The results could be the actual measurements themselves, or the identity of a cell or cells that meet particular criteria—for instance, the cell(s) having the highest measurements or measurements above some threshold. The measurement process is periodic with a particular predetermined period. However, the period is dynamically changed based on a characteristic of a signal that is received from the main cell. This could be the same measurement that is made during the analysis process.

However, another characteristic could be considered. The characteristic could be indicative of the quality of the connection with the main cell.

In some examples, the antenna circuitry comprises a main antenna for communication with the main cell and a measurement antenna for performing the analysis process for the plurality of candidate cells; and each of the main antenna and the measurement antenna is configured to operate in parallel. The main antenna can therefore maintain a connection to the main cell while the analysis process proceeds such that no break of communication with the main cell is necessitated. Additionally, once the results of the analysis process are complete, the results can be sent via the main antenna rather than requiring the measurement antenna to be reconfigured to communicate with the main cell. Consequently, the results are provided to the main cell more quickly than would otherwise be possible. The main antenna and the measurement antenna can be realised using a common array of antenna elements and with two separated RF combining circuits to form two beams where beamformed signals are presented in two antenna ports.

In some examples, a main beam generated by the main antenna is configured to transmit and receive and a measurement beam generated by the measurement antenna is configured to receive only. Results of the analysis process are therefore sent via the main antenna, for which transmission is enabled, rather than via the measurement antenna. Since the measurement antenna is used for analysis, there is no need for it to perform transmission. The measurement that is taken is therefore for a received signal from each of the cells that are analysed during the analysis process.

In some examples, during the analysis process, the measurement antenna is configured to receive from each of the plurality of candidate cells; and outside the analysis process, the measurement antenna is configured to receive from the main cell together with the main antenna. Since the measurement antenna is not constantly taking measurements for the analysis process, when it is not doing so, it can be configured to communicate with the main cell thereby increasing the capability with which data can be received from the main cell.

In some examples, the configuration circuitry is configured to change the antenna configuration by changing a beam direction of the antenna circuitry. The beam direction can be changed by rotating a multidirectional beam, or can be achieved through the physical (e.g. mechanical) rotation of the antenna assembly itself. The antenna can therefore be made to 'point' in a particular direction thereby receiving and transmitting data in that particular direction.

In some examples, the beam direction is changed to predetermined locations for each of the plurality of candidate cells. The locations of the candidate cells can therefore be known in advance, which removes the need for scanning to take place to locate the different cells. This can be useful in a system where the beam widths are particularly narrow, since scanning for cells could be very time consuming. Furthermore, in a fast moving vehicle, by the time a scanning process had completed, it is likely that the measurements taken for the first cell could be inaccurate. By knowing the locations of the cells (even the approximate locations) in advance, it is possible to jump the antenna circuitry to those locations in order to perform the required measurements.

In some examples, the configuration circuitry is configured to change the antenna configuration by changing a communication frequency of the antenna circuitry. Each of the cells could use a different frequency in order to limit the effect of interference between cells. Changing between frequencies can be time consuming and during this time, it is possible that no communication can take place with any cell.

In some examples, in response to the configuration circuitry changing the antenna configuration to communicate with each of the plurality of candidate cells, the configuration circuitry changes the antenna configuration to communicate with the main cell until the predetermined period elapses. Once the measurements have been taken for all of the candidate cells, the measurement process stops until the predetermined period elapses (keeping in mind that the predetermined period could be changed by a change in the at least one characteristic of the received signal of the main cell). In these examples, however, once the analysis process has completed, the antenna configuration is changed so that the antenna communicates with the main cell until the predetermined period elapses. In other embodiments such as those where multiple antennas are used, in order to minimise changes to the configuration of the antenna circuitry, the end of the analysis process causes the antenna to stop being used until the predetermined period elapses and a further analysis process begins again.

In some examples, in response to the predetermined period elapsing while the analysis process is still incomplete, the analysis control circuitry is configured to continue the analysis process until it is complete. If the list of candidate cells is so large that the analysis process cannot be completed before the predetermined period elapses then the process continues without restarting. This is the case even if several predetermine periods elapse before the first analysis process is complete. This way, a measurement for each candidate cell is taken. In contrast, if the analysis process was restarted each time then certain cells could never have a measurement made, which could prevent a better candidate cell from being used if the candidate cell was one of the last ones in the list of candidates.

In some examples, the apparatus comprises handover circuitry configured to perform a handover to a replacement main cell indicated by the analysis process in response to a handover demand received from the main cell. Once instructed to do so by the main cell, the handover circuitry causes a handover to take place so that the main cell changes to one indicated by the (current) main cell. The decision of which cell to perform a handover to is based on the measurements taken by the apparatus as well as other factors such as congestion for the different candidates and available resources for the candidates. For instance, even if the apparatus detects a high quality candidate cell, the main cell might not permit a handover to take place if, for instance, that candidate cell already has high congestion.

In some examples, the at least one characteristic of the received signal of the main cell comprises a quality of the received signal of the main cell. For instance the signal quality could be measured using SINR (Signal to Interference and Noise Ratio) of a signal received for the main cell.

There are a number of ways of determining how to change the predetermined period. However, in some examples, the predetermined period is decreased in response to the quality of the received signal of the main cell decreasing. Consequently, as the received signal quality decreases, the period decreases, i.e. the frequency with which the analysis process is performed increases.

In some examples, the predetermined period is proportional to the quality of the received signal of the main cell. The relationship could be, for instance, linearly proportional in which if the quality drops by a factor of x then the predetermined period also drops by a factor of x. In other examples, there could be a non-linear relationship such as a quadratic relationship. For instance if the quality drops by a factor of x then the predetermined period drops by a factor of $x^2$. This latter relationship causes a small drop in period due to small drops in quality but causes substantial drops in period as a consequence of larger drops in quality. Other relationships between quality and period can also be used.

In some examples, the at least one characteristic of the received signal of the main cell comprises a strength of the received signal of the main cell. For instance, the signal quality could be measured using RSRP (Reference Signal Received Power) of a signal received for the main cell.

There are a number of ways of determining how to change the predetermined period. However, in some examples, the predetermined period is decreased in response to the strength of the received signal of the main cell decreasing. Consequently, as the received signal strength decreases, the period decreases, i.e. the frequency with which the analysis process is performed increases.

In some examples, the predetermined period is proportional to the strength of the received signal of the main cell. The relationship could be, for instance, linearly proportional in which if the strength drops by a factor of x then the predetermined period also drops by a factor of x. In other examples, there could be a non-linear relationship such as a quadratic relationship. For instance if the strength drops by a factor of x then the predetermined period drops by a factor of $x^2$. This latter relationship causes a small drop in period due to small drops in strength but causes substantial drops in period as a consequence of larger drops in strength. Other relationships between strength and period can also be used.

In some examples, the at least one characteristic of the received signal of the main cell comprises a quality of the received signal of the main cell and a signal strength of the received signal of the main cell. These examples consider both the signal strength and the signal quality. The skilled person will appreciate that these two factors are different. A signal could be strong (high RSRP) but have a low quality (low SINR) if interference is also strong, for instance. By considering both of these factors, it is possible to make a more educated assessment of the circumstances in which the period should be changed.

There are a number of ways in which the dual factors of strength and quality can be considered. However, in some examples, the control circuitry is configured to dynamically change the predetermined period by weighting the quality of the received signal of the main cell by a quality weighting and by weighting the signal strength of the received signal of the main cell by a strength weighting to produce the predetermined period. The two factors can therefore be given different weights in order to treat one of these two parameters as more important than the other parameter. For instance, in some examples, the strength weighting is larger than the quality weighting. In these examples, all other factors notwithstanding, the strength of a signal is considered to be more important than the quality of the signal. Consequently, a small drop in signal strength will lead to a comparatively large drop in the predetermined period thereby causing the analysis process to occur more frequently. In contrast, a small drop in signal quality will lead to a smaller drop in the predetermined period; the analysis process will occur slightly more frequently but not significantly more frequently.

In some examples, the quality of the received signal of the main cell is adjusted by a quality constant and/or the signal strength of the received signal of the main cell is adjusted by a strength constant. In addition to the quality and strength being differently weighted, each of the measurements could be adjusted (either before or after the weightings being applied).

In some examples, the strength weighting is between 2 and 5 times larger than the quality weighting. For instance, the strength weighting could be between 3 and 4 times the quality weighting.

In some examples, the moving vehicle is an aeroplane. Aeroplanes are fast moving and consequently, cells are likely to quickly come into range and quickly go out of range as the plane passes. It is therefore desirable to be able to react quickly to cells becoming available, particularly if the characteristic of the main cell is such that it would be beneficial to move away from the main cell.

Particular embodiments will now be described with reference to the figures.

Figure 1:
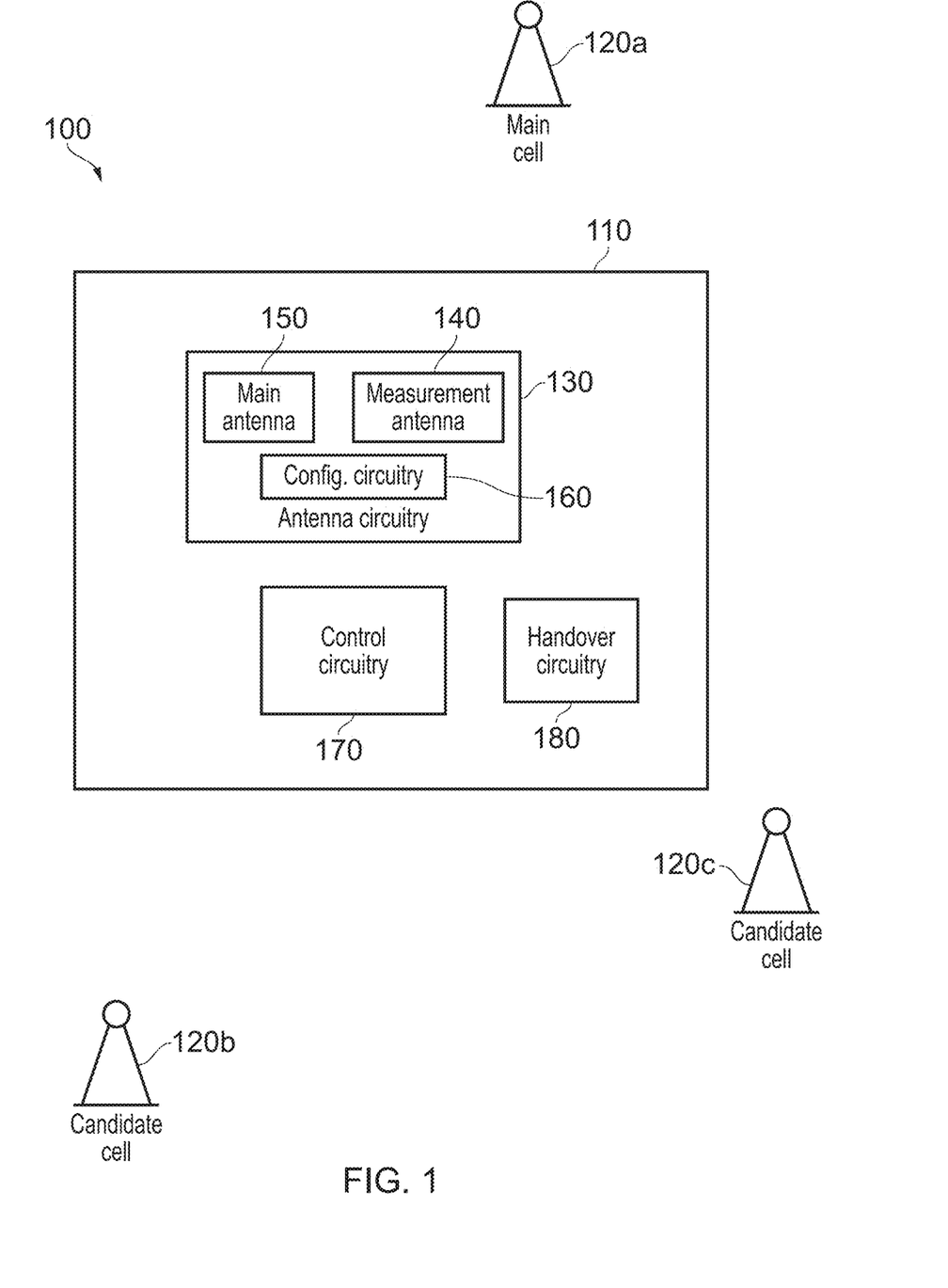
FIG. 1 illustrates a system in which an apparatus in accordance with some examples connects to one or more cells.

FIG. 1 illustrates a system 100 in which an apparatus 110 connects to one or more cells 120a, 120b, 120c. A main cell 120a is responsible for enabling the upload and download of data to a network. Other candidate cells 120b, 120c exist within the network, with similar functionality to the main cell. Periodically, checks will be made by the apparatus 110 in order to determine whether one of the other candidate cells 120b, 120c provides a better connection for the apparatus 110 and would therefore act as a better main cell for the apparatus. Other cells might become more appropriate as a result of the apparatus 110 being moved. For instance, the apparatus may move closer to one of the candidate cells 120c such that a better connection can be made than with the current main cell 120a and therefore an improvement in the ability to upload and download data to and from the apparatus 110 can be made by using the candidate cell 120c as the main cell 120a. This will result in a handover process being ordered by the main cell 120a.

In order to make these measurements, it is necessary for a "analysis process" to take place. During the analysis process, measurements of the candidate cells 120b, 120c are made in order to determine whether one of these would act as a better replacement for the main cell 120a. The results of these measurements are sent to the main cell 120a which determines whether a handover should take place. Whether or not a handover should take place is dependent not only on the measurements and any degree of improvement to be made, but also on the capabilities of the candidate cell 120c to which a handover would take place. For instance, even if a particular candidate cell 120c would provide the best connection, handover may not take place if the cell is heavily congested. It will appreciated that a measurement of the main cell 120a may also be made in order to provide a comparison with the candidate cells 120b, 120c. However, this need not necessarily take place during the analysis process and can instead occur during regular communication.

The apparatus 110 includes antenna circuitry 130, which in this example includes a main antenna 150 for receiving and transmitting to the main cell 120a. The antenna circuitry 130 also includes a measurement antenna 140. In this example, the measurement antenna 140 is only capable of receiving data. This is because the measurements that are made by the measurement antenna in order to determine the quality of other cells 120b, 120c might only necessitate the receiving of data. Configuration circuitry 160 is provided in order to change a configuration of the main antenna 150 and/or the measurement antenna 140. By changing the configuration of the antennas 140, 150, it is possible to change the cells 120a, 120b, 120c with which communication can occur. The change in configuration could correspond with a change in frequency that is used for transmission and reception, and/or could correspond with a change in angle used for receiving or transmitting by each of the antennas 140, 150. Rotation of the antennas 140, 150 can be achieved by physically rotating the antennas 140, 150. In other examples, rotation of the beam can be achieved using a multi-directional antenna array and by shaping the beam accordingly. Configuration could also include factors such as a width of the beam and/or the power used. Other configuration options will be known to the skilled person. The apparatus 110 also includes control circuitry 170. The control circuitry 170 is used to co-ordinate the antenna circuitry 130 and particularly the configuration circuitry 160 in order to make measurements of the cells 120a, 120b, 120c during a analysis process. Handover circuitry 180 is also provided to perform the handover process (or at least the part of the handover process that is to be performed by the apparatus 110) when ordered to do so by the main cell 120a. In this example, the control circuitry 170 has access to a database of locations of cells. From this, it is possible to determine the configuration to be applied to one of the antennas 140, 150 to enable communication with that cell. For instance, this process might include calculating an antenna angle based on the location of the apparatus 110 and the location of a particular cell 120a, 120b, 120c.

In these examples, the control circuitry causes the analysis process to be performed with a predetermined period. The predetermined period is dynamically changeable based on a characteristic of a signal received from the main cell. For instance, based on the characteristic of the signal received by the main cell 120a, the predetermined period is changed such that, barring another change in the characteristic of the signal received from the main cell, the analysis process will continue to be performed with the newly determined predetermined period. The analysis process does therefore not merely occur on demand.

Note that in this example, separate main antennas 150 and measurement antennas 140 are provided. However, in some examples, a single antenna may be used. In such examples, communication with the main cell 120a is paused while measurements are made from the other candidate cells 120b, 120c (assuming, of course, that the antenna cannot communicate with all cells 120a, 120b, 120c simultaneously). Similarly, other examples may place elements such as the configuration circuitry 160, control circuitry 170, and the handover circuitry 180 in different locations to those illustrated with respect to FIG. 1.

Figure 2A:
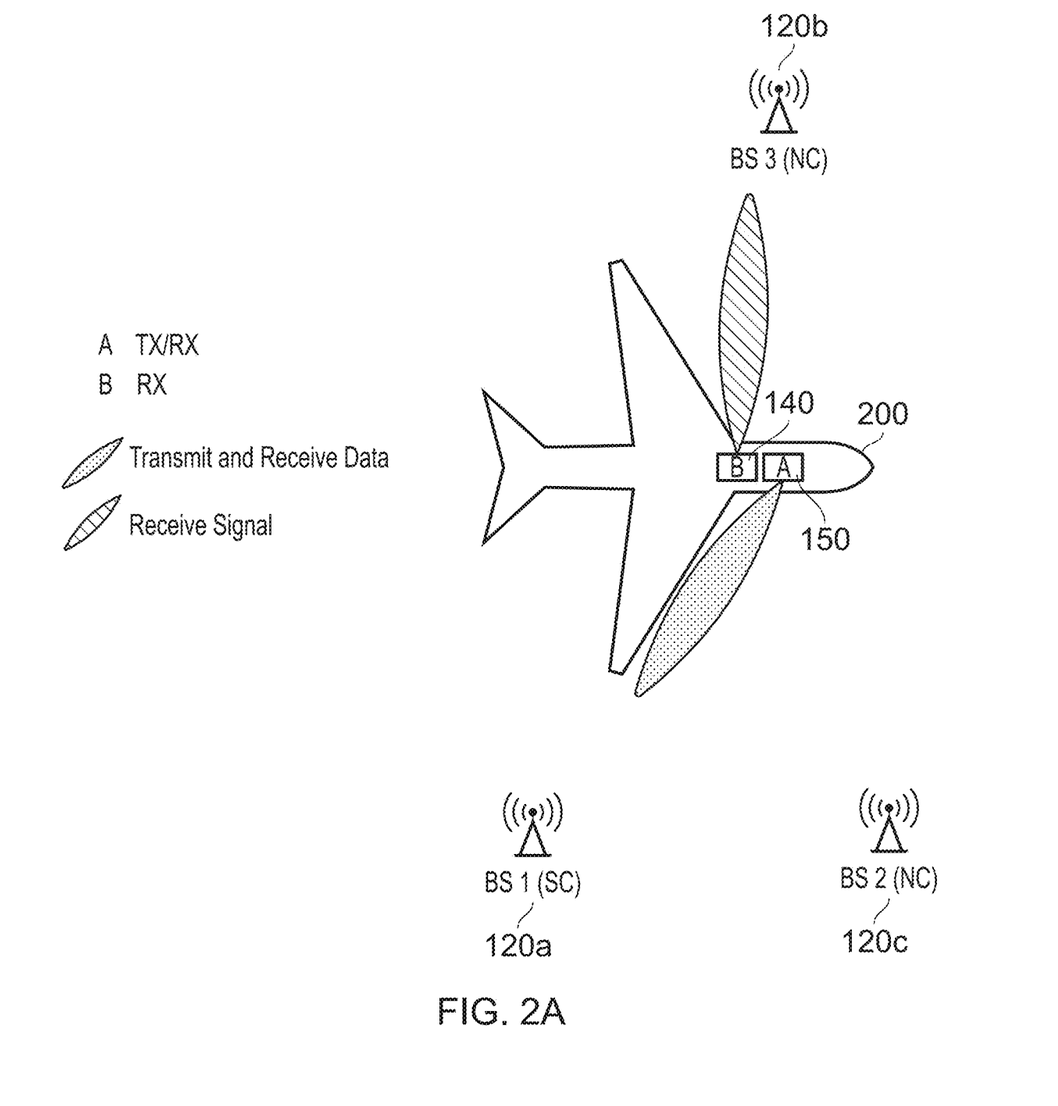
Figure 2B:
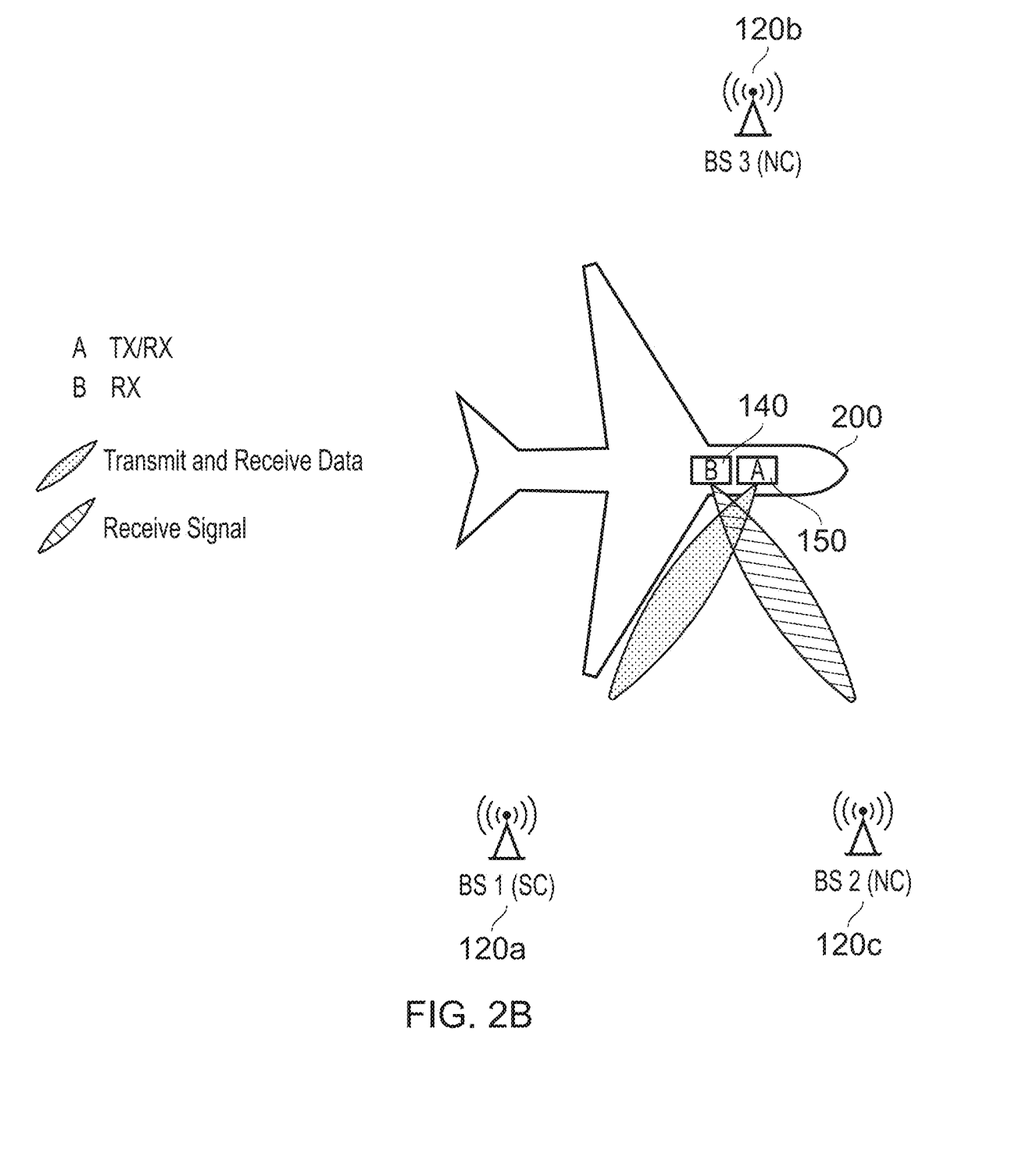
Figure 2C:
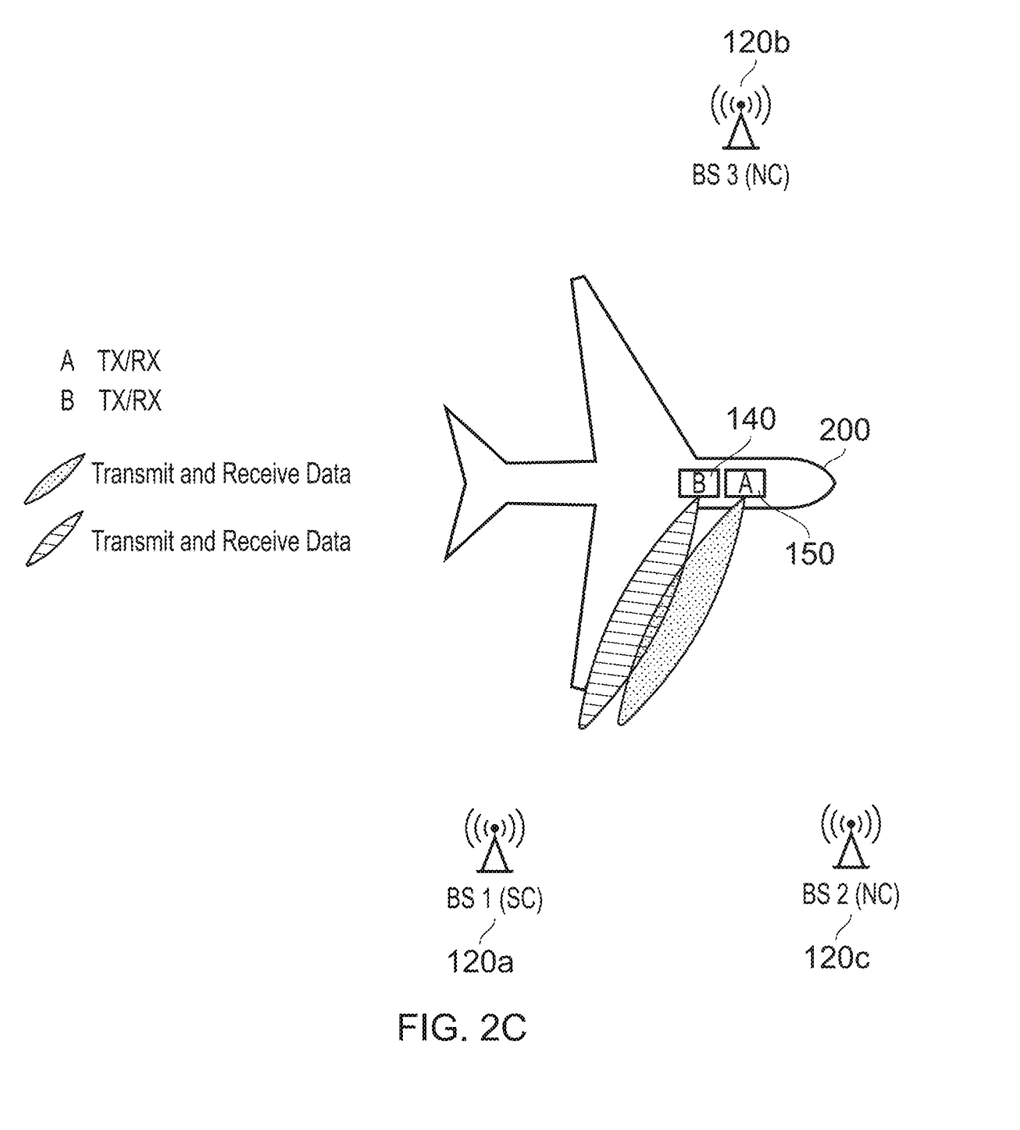

FIG. 2 (made up of FIGS. 2A, 2B and 2C) collectively illustrate the behaviour of the analysis process.

In FIG. 2A, a vehicle in the form of an aeroplane 200 that contains the apparatus 110, passes over cells 120a, 120b, 120c. The apparatus 110 is initially in communication with a main cell (also known as a serving cell SC) 120a. Communication is achieved via a main antenna 150. When an analysis process occurs, a measurement antenna 140 measures the received signal of a first candidate cell (also known as a neighbouring cell NC) 120b. Since different antennas 140, 150 are used, the transmission and reception of data via the main antenna 150 is not interrupted as a consequence of the analysis process.

In FIG. 2B, a next cell 120c is assessed. In this example, this is achieved by rotating the measurement antenna 140 so as to receive data from the candidate cell 120c. A change in other configuration parameters (such as frequency) could also occur at this point in order to enable receiving the signal produced by the second candidate cell 120c.

Note that in this example, the locations of the cells 120a, 120b, 120c are known to the apparatus 110. This saves the need to "scan" for particular cells, which would be time consuming. Indeed, the process of scanning could be sufficiently slow that by the time the scanning process had completed, the measurement information made for a first candidate cell could have substantially changed, thereby leading to inaccurate or unusable measurements. Again, the configuration of the main antenna 150 is unchanged, and consequently receiving and transmitting of data via the main antenna 150 continues as before.

FIG. 2C illustrates the conclusion of the analysis process. The measurement antenna 140 is rotated in order to acquire measurements for the serving cell 120a, although information regarding the main cell 120a could also be performed using the main antenna 150. Having acquired this data, the results of the measurements are sent to the main cell 120a. This could be the implements themselves, or could be identities of particular cells (such as those meeting a minimum threshold or those having the highest measurements). If the data has been transmitted to the main cell, the main cell 120a will make a determination as to whether a handover should occur. This can be achieved by negotiation with the other cells 120b, 120c may be made based on issues such as contention, resource usage, resource levels, and so on. If a handover is to be performed, the main cell 120a instructs the apparatus 110 on the vehicle 200 and handover circuitry 180 on the apparatus 110 performs the handover process. The consequence, if a handover is to occur, the identity of the main cell 120a will change. Note that another consequence of the measurement process is that no handover is to be performed. In which case no instruction is transmitted from the main cell 120a.

As previously explained, the analysis process occurs with a predetermined period. The predetermined period is dependent on a characteristic of a signal that is received from the main cell 120a. There are a number of different characteristics that can be used. In some examples, multiple characteristics are simultaneously considered for determining the predetermined period. Subsequently, a number of different factors may contribute to the decision to how often the analysis process is to occur.

Once the analysis process has completed, the measurement antenna 140 is configured to communicate with the main cell 120a. In this way, the measurement antenna 140 is able to assist the main antenna 150 in receiving data. If the measurement antenna is capable of transmitting, then the measurement antenna 140 can also transmit to the main cell 120a thereby increasing the communication capability.

Figure 3A:
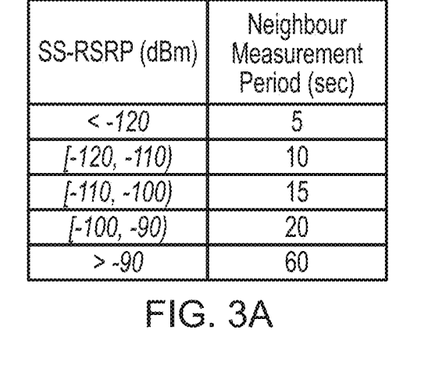
FIG. 3A illustrates a table in which the period is dependent on Reference Signal Received Power (RSRP) level.

FIG. 3A illustrates a table in which the predetermined period is dependent on Reference Signal Received Power (RSRP) level, which is an indicator of signal strength. In particular, different signal strengths are bounded into one or more groups, period depending on which group the RSRP value falls into. In this example, five different groupings are provided with a highest RSRP grouping of 90 dBm causing a predetermined period of 60 seconds and a lowest group having an RSRP of less than −120 dBm causing a predetermined period of 5 seconds. Of course, in other examples, the granularity could be finer. Furthermore in other examples, period could be determined using an equation in order to give a fuller spectrum of possible periods.

Figure 3B:
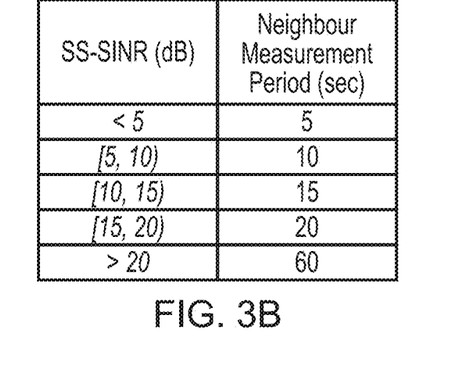
FIG. 3B illustrates a table in which the period is determined based on the Signal to Interference and Noise Ratio (SINR)

FIG. 3B illustrates a table in which the predetermined period is determined based on the Signal to Interference and Noise Ratio (SINR). SINR is a measurement of signal quality. In particular, whilst RSRP may signal strength, the SINR values considers that strength relative to interference and noise. Consequently, while a signal could be strong, a large amount of interference and noise may render that signal strong but low quality. Again, the table shown in FIG. 3B groups different SINR values into blocks, with a different measurement period being assigned to each block. The lowest block considers SINR values of less than 5 dB, which results in a neighbour measurement period of 5 seconds, a highest group considers an SINR value of greater than 20 dB, which results in a measurement period of 60 seconds. Once again, more than 5 groups may be provided and the relationship between SINR and period could be determined based on an equation in order to give a full spectrum of possible predetermined period values.

Figure 3C:
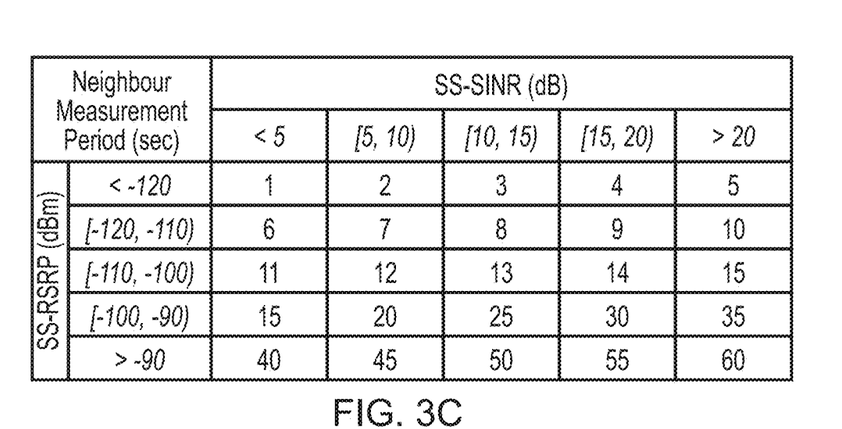
FIG. 3C illustrates and example in which two parameters are considered.

FIG. 3C illustrates and example in which two parameters are considered. In particular, both signal strength (measured by RSRP) and signal quality (measured by SINR) are measured and the two measurements are combined in order to determine the predetermined period. The possible values for the period extend from one second (when the SINR of the signal received from the main cell 120a is less than 5 dB and the RSRP of the received signal is less than −120 dBm) to 60 seconds when the SINR of the received signal is greater than 20 dB and the RSRP of the received signal is greater than −90 dBm). Values between these points are dependent on the SINR and RSRP values. In particular, for low values of RSRP the period increases slowly as the SINR increases. In contrast, at a high RSRP the period increases rapidly as the SINR increases. Consequently, the signal strength in the form of the RSRP is the dominant factor in this example.

As previously explained, rather than using a lookup table in order to determine the period, it is possible to use an equation. For instance, one such equation can be used in order to convert the RSRP R (measured in dBm) and the SINR S (measured in dB) into a period is:

$$p(R,S)=\alpha \times (R+120)+\beta \times (S-5)+1$$

Where $\alpha$ and $\beta$ are weightings applied to the RSRP and SINR respectively.

Figure 3D:
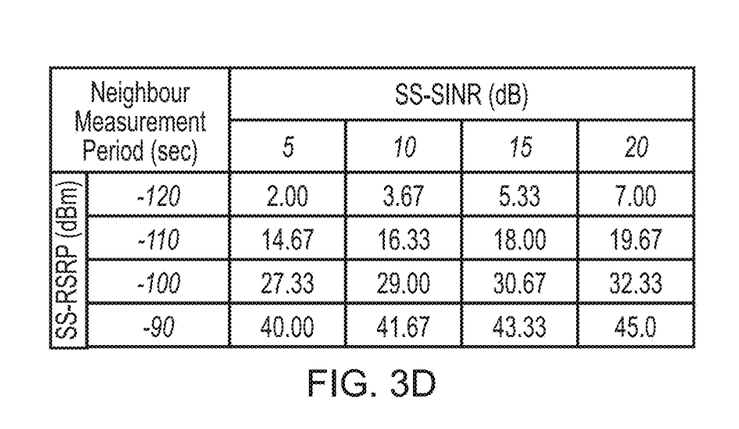
FIG. 3D illustrates the application of an equation that relates signal strength and signal quality.

FIG. 3D illustrates the application of the above equation (where $\alpha=1.26666$ and $\beta 3=0.3333$) for certain representative points. In this example, the possible period values range from two seconds (when the SINR is 5 and that RSRP is −120) to 45 seconds (when the SINR is 20 and the RSRP is −90). Again, in this example, the RSRP is the dominant factor meaning that small changes in the RSRP result in large changes in the period as compared to similar sized changes in the SINR. In particular, it will be appreciated from the parameters that the RSRP is approximately 3.8 times more dominant than the SINR.

Of course, it will be appreciated by the skilled person that different parameters and different equations can be used. In each of the above examples it is clear that as the signal quality and the signal strength decline, the period also declines resulting in the analysis process being performed more often. This is to represent the fact that as the received signal becomes weaker and/or lower quality, it is more desirable to find a replacement for the main cell 120a and so the analysis process is performed more frequently. In contrast, when the signal quality is high and/or the signal strength is high, the period is larger. This represents the fact that not only is there little to be gained by performing the analysis process, but by avoiding performing the analysis process it is possible to reduce signalling overhead.

Figure 4:
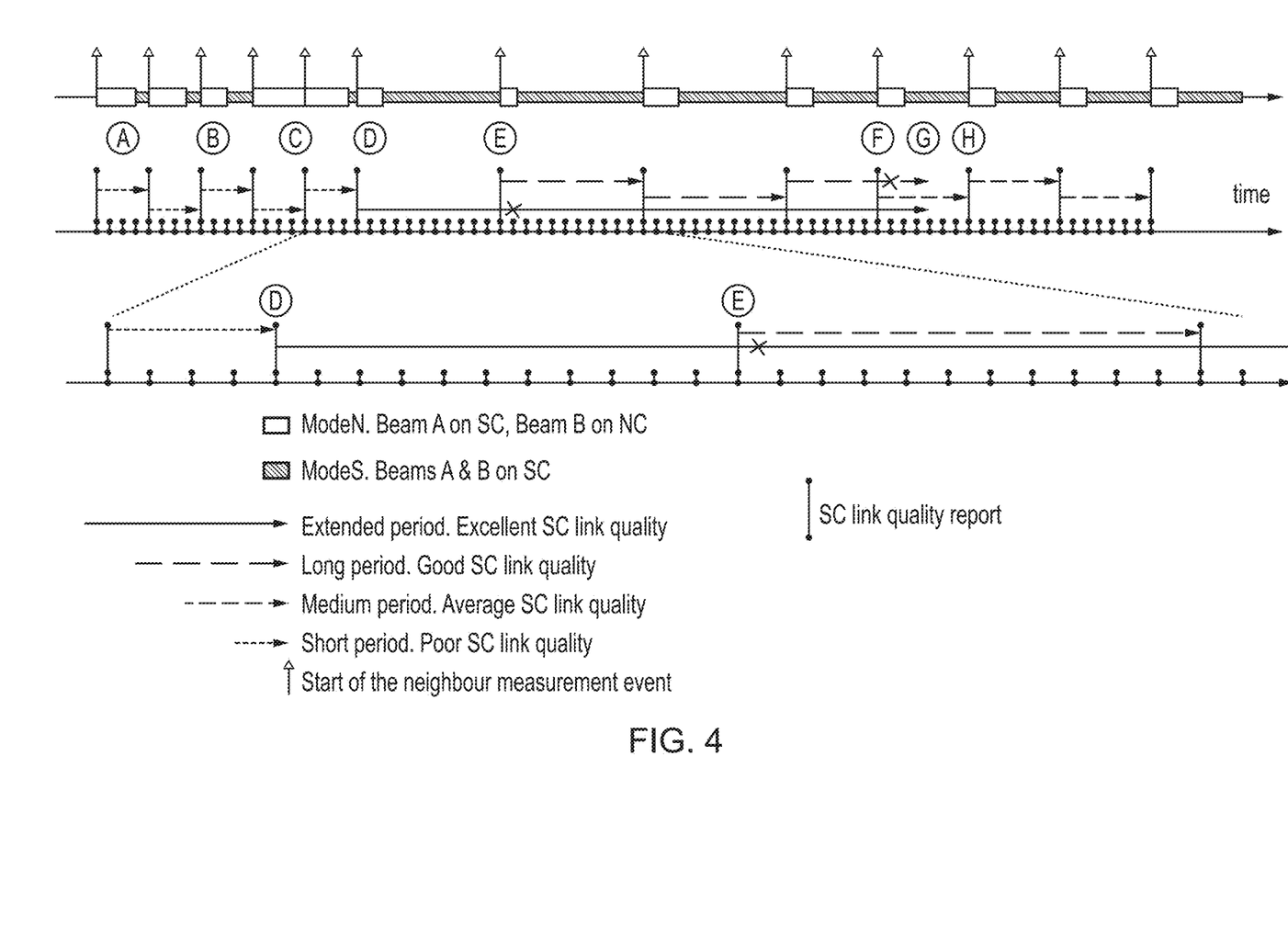
FIG. 4 illustrates a timeline that shows a series of events that occur during the operation of the apparatus.

FIG. 4 illustrates a timeline that shows a series of events that occur during the operation of the apparatus 110. The x-axis in FIG. 4 represents time. As will be seen, at periodic intervals the SC link quality reports are generated in order to determine a characteristic of the signal received from the main cell. Separately to this, an analysis process is initiated as indicated by the upward pointing arrows.

At a point A, an analysis process occurs. That is, the apparatus operates in a modeN. Within this analysis process, each of the candidate cells 120b, 120c is measured in order to determine whether they would be a better choice of main cell 120a. Note that FIG. 4 does not indicate the outcome of any of these analysis processes. Once the analysis is complete, the configuration of the measurement antenna 140 is set so that the measurement antenna 140 can assist in the receiving of data from the main cell 120a. The apparatus is said to operate in modeS. This occurs until the next analysis process as dictated by the predetermined period.

It will be noted at point B, the analysis process proceeds more quickly than at point A. This could be as a consequence of there being a smaller number of candidate cells 120b, 120c at point B as compared to point A. This is to say that the present technique is able to take advantage of the changing number of candidate cells 120b, 120c that are available at any one time. In particular, as the number of candidate cells 120b, 120c drops, the time that is taken performing the analysis process can be shortened. This makes it possible for the measurement antenna 140 to assist the main antenna 150 for a longer period of time. This is in contrast to systems where the analysis process necessitates a continual measuring of candidate cells 120b, 120c regardless of how many such candidate cells 120b, 120c are present. If measurements gaps were to be used, then measuring of candidate cells 120b, 120c would be continuous for the duration of the gap. The present invention terminates the analysis process once all the candidate cells are measured.

At a point C, the number of candidate cells 120b, 120c is sufficiently large that the predetermined period is exceeded. That is to say that time taken to perform the analysis process is larger than the predetermined period. In these examples, the analysis process does not restart from the beginning when the predetermined period elapses. Instead, the analysis process continues as if the predetermined period had not elapsed. This helps to prevent a situation in which the same first subset of candidate cells are repeatedly measured each time the predetermined period elapses. Once the analysis process is completed by considering each of the candidate cells 120b, 120c, the next analysis process occurs when the predetermined period next elapses. In the example of FIG. 4, this occurs at point D.

At a point D, the link quality report of the main cell 120a indicates that the characteristic of the signal from the main cell 120a is sufficiently good that a long predetermined period can be set. In particular, it is anticipated that a further analysis process would not occur until a point G. Regardless, the link reports of the main cell 120a continue to be performed with the same period as illustrated in FIG. 4.

At a point E, it is determined that from the link quality reports of the main cell 120a that it is necessary to decrease the predetermined period. Consequently, the analysis process that was scheduled to occur at point G is effectively 'cancelled'. Having re-evaluated the predetermined period, it is determined that a analysis process should have occurred by this point, and so a further analysis process is immediately scheduled for point E. Analysis processes then occur periodically based on the reassessed predetermined period.

The process continues to a point F where, once again, the link quality reports of the main cell 120a indicate a further change to the characteristic of the signal received by the main cell 120a (e.g. the quality or strength of the signal).

Consequently, the next analysis process that was scheduled (again at point G), is cancelled, the predetermined reset to as smaller value. Based on the newly set predetermined period, the next analysis process is scheduled for a point H.

Figure 5:
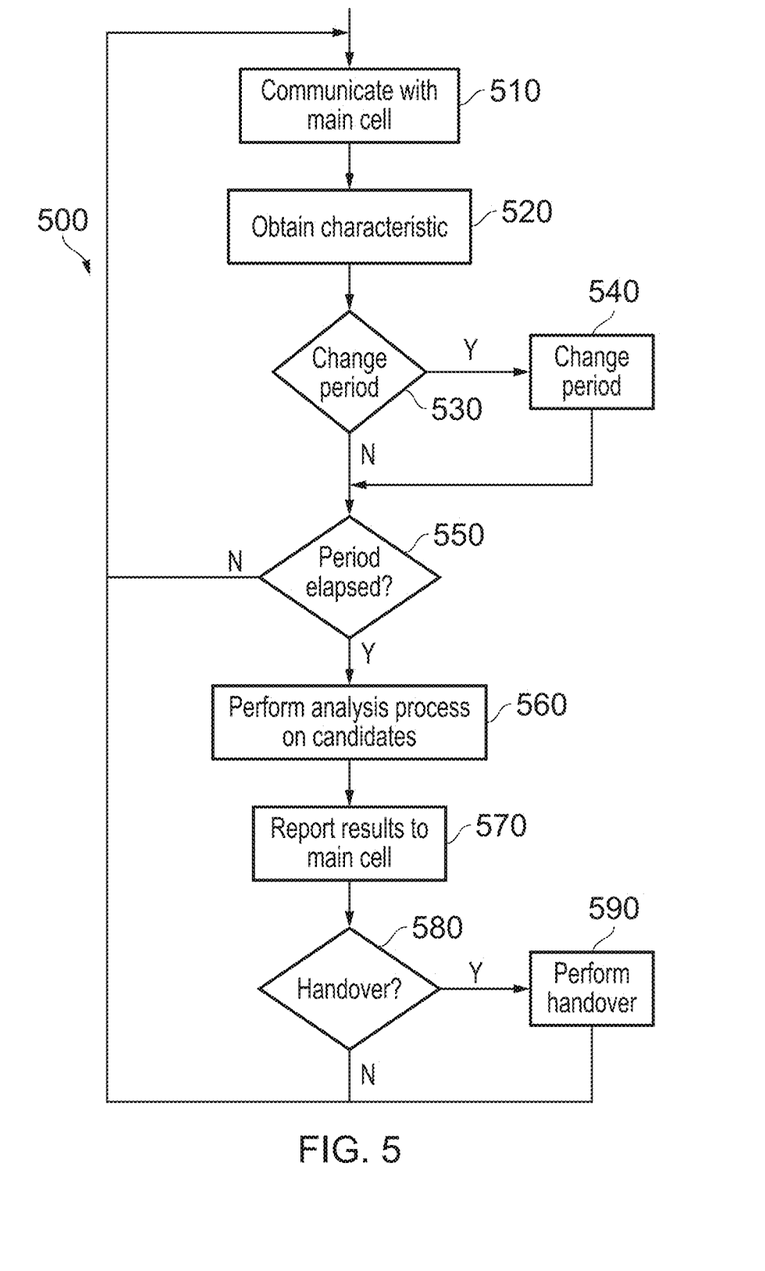
FIG. 5 illustrates a flow chart that shows a process of selecting the predetermined period in accordance with some embodiments.

FIG. 5 illustrates a flow chart 500 that shows a process of selecting the predetermined period in accordance with some embodiments. At step 510, communication occurs between the apparatus 110 and a main cell 120a. This could include the transmission and reception of data as requested by user equipment. At a step 520, a characteristic of the main cell is determined. This may be received via a link quality report for instance and could be based on a strength or a quality of the received signal. At a step 530, it is determined whether a predetermined period with which the analysis processes are performed should be changed. The calculation of the predetermined period could be made, for instance, with reference to the example values shown in each of FIGS. 3A, 3B, 3C and 3D. If a change is to occur, then the period is changed at a step 540. In either event, at step 550, it is determined whether the predetermined period has elapsed or not. If not, then the process returns to step 510. If the period has elapsed, then at step 560, the analysis process is performed on the candidate cells 120b, 120c. That is, an analysis process is performed. This could be performed for each of the candidate cells 120b, 120c, by changing the configuration of the measurement antenna 140 to correspond with the candidate cells 120b, 120c that are known to the apparatus 110. It may also include a measurement of the main cell 120a, although information regarding the main cell 120a could also be performed using the main antenna 150. The specific measurements made are not detailed here since they are not relevant and are clearly dependent on the measurement dictated by the communication standard being used. However, in a similar manner to the characteristic that is obtained at step 520, the measurement process performed as part of the analysis process could consider a signal strength and/or quality. At a step 570, the results of the analysis process are reported to the main cell 120a. The reporting could include the actual measurements taken. However, in some examples, the results could include the identity of certain cells e.g. those that score most highly or those whose measurement exceeds a particular threshold. In response to this, the main cell 120a may order a handover to take place. At step 580, it is determined whether the cell 120a has ordered a handover. If not, then the process returns to step 510. As part of this, the measurement antenna 140 may be reconfigured in order to assist in the receiving of the signal from the main cell 120a. If a handover is to take place (e.g. as ordered by the main cell when results of the analysis process are provided), then at step 590, the handover process is performed by the apparatus 110. This has the consequence that the main cell 120a will change. Again, the configuration of the measurement antenna 140 may be changed to correspond with the new main cell. The process then returns to step 510.

Consequently it can be seen how the predetermined period with which the analysis process occurs changes over time as a consequence of the changing characteristics (e.g. strength and/or quality) of the signal received for the main cell. As a consequence, energy is not unnecessarily expended and bandwidth is not unnecessarily lost as a consequence of performing the analysis process even though the main cell 120a already has a good signal strength/quality. On the other hand, the analysis processes can be made frequent enough that it is possible to quickly find an alternative for the main cell 120a if, for example, the quality or strength of the signal received for the main cell 120a deteriorates too much.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus for use with a moving vehicle, the apparatus comprising:
   antenna circuitry configured to communicate with a main cell using an antenna configuration;
   configuration circuitry configured to perform an analysis process in which the antenna configuration is changed to communicate with and create a measurement of each of a plurality of candidate cells including the main cell, and to provide a result of the analysis process to the main cell; and
   control circuitry configured to cause the configuration circuitry to perform the analysis process with a predetermined period,
   wherein the control circuitry is configured to dynamically change the predetermined period based on at least one characteristic of a received signal of the main cell, and
   wherein the at least one characteristic of the received signal of the main cell comprises a quality of the received signal of the main cell and a signal strength of the received signal of the main cell,
   wherein the control circuitry is configured to dynamically change the predetermined period by weighting the quality of the received signal of the main cell by a quality weighting and by weighting the signal strength of the received signal of the main cell by a strength weighting to produce the predetermined period.

2. The apparatus according to claim 1, wherein:
   the antenna circuitry comprises a main antenna for communication with the main cell and a measurement antenna for performing the analysis process for the plurality of candidate cells; and
   each of the main antenna and the measurement antenna is configured to operate in parallel.

3. The apparatus according to claim 2, wherein a main beam generated by the main antenna is configured to transmit and receive and a measurement beam generated by the measurement antenna is configured to receive only.

4. The apparatus according to claim 2, wherein:
   during the analysis process, the measurement antenna is configured to receive from each of the plurality of candidate cells; and outside the analysis process, the measurement antenna is configured to receive from the main cell together with the main antenna.

5. The apparatus according to claim 1, wherein the configuration circuitry is configured to change the antenna configuration by changing a beam direction of the antenna circuitry.

6. The apparatus according to claim 5, wherein the beam direction is changed to predetermined locations for each of the plurality of candidate cells.

7. The apparatus according to claim 1, wherein the configuration circuitry is configured to change the antenna configuration by changing a communication frequency of the antenna circuitry.

8. An apparatus for use with a moving vehicle, the apparatus comprising:
antenna circuitry configured to communicate with a main cell using an antenna configuration;
configuration circuitry configured to perform an analysis process in which the antenna configuration is changed to communicate with and create a measurement of each of a plurality of candidate cells including the main cell, and to provide a result of the analysis process to the main cell; and
control circuitry configured to cause the configuration circuitry to perform the analysis process with a predetermined period,
wherein the control circuitry is configured to dynamically change the predetermined period based on at least one characteristic of a received signal of the main cell, and
wherein in response to the configuration circuitry changing the antenna configuration to communicate with each of the plurality of candidate cells, the configuration circuitry changes the antenna configuration to communicate with the main cell until the predetermined period elapses.

9. The apparatus according to claim 1, wherein the strength weighting is larger than the quality weighting.

10. The apparatus according to claim 1, wherein the quality of the received signal of the main cell is adjusted by at least one of a quality constant and/or and the signal strength of the received signal of the main cell is adjusted by a strength constant.

11. The apparatus according to claim 1, wherein the strength weighting is between 2 and 5 times larger than the quality weighting.

12. The apparatus according to claim 1, wherein the moving vehicle is an airplane.

13. The apparatus according to claim 1, comprising:
handover circuitry configured to perform a handover to a replacement main cell indicated by the analysis process in response to a handover demand received from the main cell.

14. An apparatus for use with a moving vehicle, the apparatus comprising:
antenna circuitry configured to communicate with a main cell using an antenna configuration;
configuration circuitry configured to perform an analysis process in which the antenna configuration is changed to communicate with and create a measurement of each of a plurality of candidate cells including the main cell, and to provide a result of the analysis process to the main cell; and
control circuitry configured to cause the configuration circuitry to perform the analysis process with a predetermined period,
wherein the control circuitry is configured to dynamically change the predetermined period based on at least one characteristic of a received signal of the main cell, and
wherein in response to the predetermined period elapsing while the analysis process is still incomplete, the control circuitry is configured to continue the analysis process until it is complete.

15. An apparatus for use with a moving vehicle, the apparatus comprising:
antenna circuitry configured to communicate with a main cell using an antenna configuration;
configuration circuitry configured to perform an analysis process in which the antenna configuration is changed to communicate with and create a measurement of each of a plurality of candidate cells including the main cell, and to provide a result of the analysis process to the main cell; and
control circuitry configured to cause the configuration circuitry to perform the analysis process with a predetermined period,
wherein the control circuitry is configured to dynamically change the predetermined period based on at least one characteristic of a received signal of the main cell,
wherein the at least one characteristic of the received signal of the main cell comprises a quality of the received signal of the main cell, and
wherein the predetermined period is decreased in response to the quality of the received signal of the main cell decreasing.

16. The apparatus according to claim 15, wherein the predetermined period is proportional to the quality of the received signal of the main cell.

17. An apparatus for use with a moving vehicle, the apparatus comprising:
antenna circuitry configured to communicate with a main cell using an antenna configuration;
configuration circuitry configured to perform an analysis process in which the antenna configuration is changed to communicate with and create a measurement of each of a plurality of candidate cells including the main cell, and to provide a result of the analysis process to the main cell; and
control circuitry configured to cause the configuration circuitry to perform the analysis process with a predetermined period,
wherein the control circuitry is configured to dynamically change the predetermined period based on at least one characteristic of a received signal of the main cell,
wherein the at least one characteristic of the received signal of the main cell comprises a strength of the received signal of the main cell, and
wherein the predetermined period is decreased in response to the strength of the received signal of the main cell decreasing.

18. The apparatus according to claim 17, wherein the predetermined period is proportional to the strength of the received signal of the main cell.

19. A method of analyzing a plurality of candidate cells from a moving vehicle, the method comprising:
communicating with a main cell using an antenna configuration;
performing an analysis process in which the antenna configuration is changed to communicate with and create a measurement of each of a plurality of candidate cells including the main cell, and to provide a result of the analysis process to the main cell; and causing the analysis process to be performed with a predetermined period, wherein the predetermined period is dynamically changed based on a quality of a received signal of the main cell, wherein the at least one characteristic of the received signal of the main cell comprises a quality of the received signal of the main cell and a signal strength of the received signal of the main cell, and wherein the predetermined period is dynamically changed by weighting the quality of the received signal of the main cell by a quality weighting and by weighting the signal strength of the received signal of the main cell by a strength weighting to produce the predetermined period.

* * * * *

UNITED STATES PATENT AND TRADEMARK OFFICE
CERTIFICATE OF CORRECTION

PATENT NO. : 12,284,534 B2
APPLICATION NO. : 17/824374
DATED : April 22, 2025
INVENTOR(S) : Katepalli et al.

Page 1 of 1

It is certified that error appears in the above-identified patent and that said Letters Patent is hereby corrected as shown below:

In the Claims

In Claim 10, Column 13, Line 41, delete "and/or" before -- and --.

Signed and Sealed this
Third Day of June, 2025

Coke Morgan Stewart
*Acting Director of the United States Patent and Trademark Office*